United States Patent
Araki et al.

(10) Patent No.: US 7,522,804 B2
(45) Date of Patent: Apr. 21, 2009

(54) STRUCTURED SHELF

(75) Inventors: Hideo Araki, Kawasaki (JP); Katsumi Kanasaki, Kawasaki (JP); Hirofumi Imabayashi, Kawasaki (JP); Kenji Toshimitsu, Kawasaki (JP); Yuichi Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/018,975

(22) Filed: Dec. 21, 2004

(65) Prior Publication Data

US 2006/0062538 A1 Mar. 23, 2006

(30) Foreign Application Priority Data

Sep. 17, 2004 (JP) ............... 2004-272025

(51) Int. Cl.
*G02B 6/00* (2006.01)
(52) U.S. Cl. ............... 385/135; 385/134; 385/147
(58) Field of Classification Search ......... 385/134–135, 385/147, 88; 361/103; 379/413.02
See application file for complete search history.

(56) References Cited

U.S. PATENT DOCUMENTS

| | | | | |
|---|---|---|---|---|
| 5,037,167 A | * | 8/1991 | Beaty ................ | 385/147 |
| 5,129,030 A | * | 7/1992 | Petrunia .............. | 385/135 |
| 5,204,929 A | * | 4/1993 | Machall et al. ........ | 385/135 |
| 5,402,515 A | * | 3/1995 | Vidacovich et al. ..... | 385/135 |
| 5,442,726 A | * | 8/1995 | Howard et al. ......... | 385/135 |
| 5,511,144 A | * | 4/1996 | Hawkins et al. ........ | 385/135 |
| 5,689,604 A | * | 11/1997 | Janus et al. .......... | 385/134 |
| 5,913,006 A | * | 6/1999 | Summach .............. | 385/134 |
| 6,320,734 B1 | * | 11/2001 | Sonobe et al. ......... | 361/103 |
| 6,356,697 B1 | * | 3/2002 | Braga et al. .......... | 385/135 |
| 6,445,865 B1 | * | 9/2002 | Janus et al. .......... | 385/135 |
| 6,644,866 B1 | | 11/2003 | Kusuda et al. | |
| 6,912,349 B2 | * | 6/2005 | Clark et al. .......... | 385/134 |
| 6,959,084 B1 | * | 10/2005 | DeCraene ............. | 379/413.02 |
| 2005/0175293 A1 | * | 8/2005 | Byers et al. .......... | 385/88 |
| 2005/0196120 A1 | * | 9/2005 | Colombo et al. ........ | 385/135 |

FOREIGN PATENT DOCUMENTS

| JP | 2909803 | 8/1996 |
|---|---|---|
| JP | 2000-147269 | 5/2000 |

* cited by examiner

*Primary Examiner*—Brian Healy
*Assistant Examiner*—Guy G Anderson
(74) *Attorney, Agent, or Firm*—Katten Muchin Rosenman LLP

(57) ABSTRACT

In an optical transmission node, a plurality of shelves, respectively connected to a plurality of optical cables having limitations on bending radius, are stored in one rack of the node. In a shelf body thereof, the first and second opening portions are made in a front surface, and an extra-cable looping device loops an extra portion of the optical cable, further a moving mechanism is provided for moving the extra-cable looping device to avoid a space occupied by the units in a state removed from the second opening portion, this enables extra-cable handling within a limited spatial range and the insertion/removal of the units having various functions from the shelf in a state where the cable is active and further the improvement of a shelf mounting density per rack.

16 Claims, 11 Drawing Sheets

FIG. 13
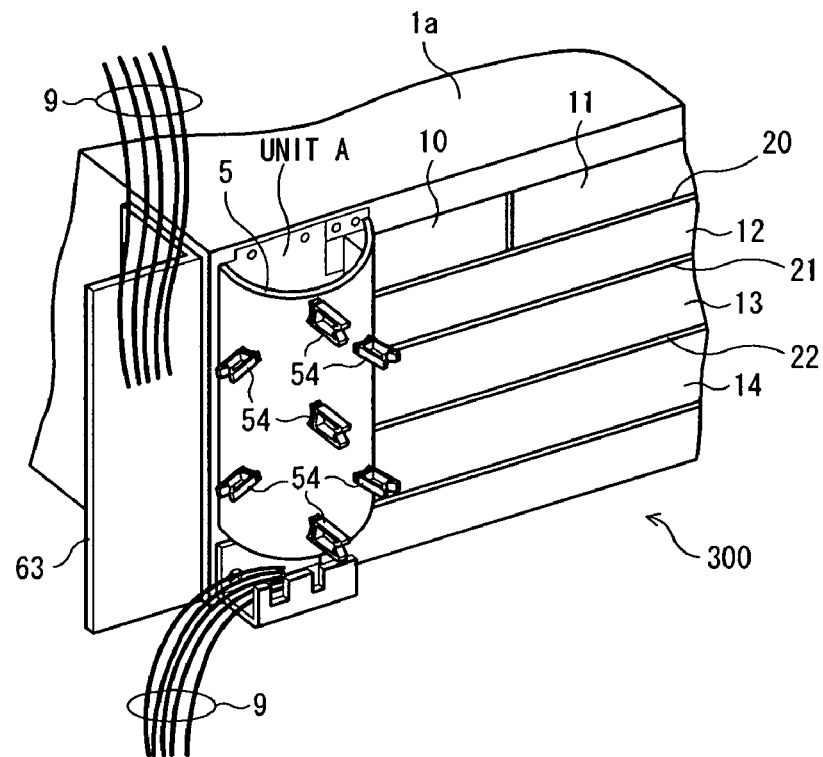
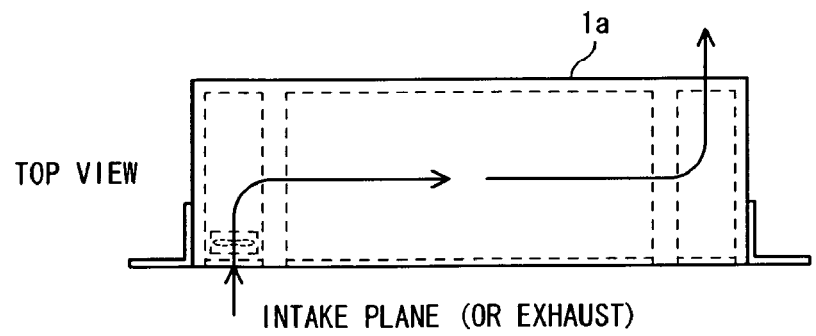
FIG. 14A
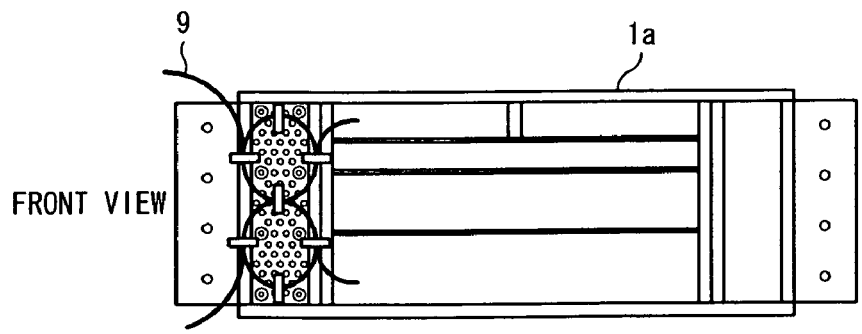
FIG. 14B

STRUCTURED SHELF

BACKGROUND OF THE INVENTION

(1) Field of the Invention

The present invention relates to a structured shelf suitable in a case in which a plurality of shelves respectively connected to a plurality of cables, for example, having limitations on bending radius are accommodated in one rack, and more particularly to a structured shelf suitable in a case in which a plurality of line accommodating units respectively connected to a plurality of optical cables having limitations on allowable bending radius are stored in one rack provided in a transmission station.

(2) Description of the Related Art

In general, a transmission signal such as optical signal or electric signal is wire-transmitted in a state where a plurality of transmission cables, such as optical cables or electric cables, or transmission mediums are collectively hardwired in a transmission station (which will be referred to hereinafter as a station or node; for example, transmission terminal station, repeating station, reception terminal station, and other stations) or in a transmission apparatus. An optical cable can provide high-quality transmission, transmission stability, large-capacity data transmission and long-distance transmission, and each station in an optical transmission network carries out interface processing on each of optical signals, packet signals and other signals. Concretely, it carries out optical signal processing, termination processing, transfer processing, format conversion, and others. Each of the functions for these interface processing is implemented in one or a plurality of shelves (for example, line accommodating units). Moreover, each of the plurality of shelves are accommodated in a state fixed by several columns constituting a rack (frame, unit frame). In this sense, the shelf is referred to as a rack-mounted shelf.

In addition, in each shelf, $m_1$ ($m_1$ denotes a natural number) slots permitting the insertion of $m_1$ board units are placed in an equally spaced condition. Each of the board units is equipped with one printed board (printed-circuit board) for the storage of $m_2$ ($m_2$ depicts a natural number) subscriber's lines, and $m_3$ ($m_3$ represents a natural number smaller than $m_1$) board units are detachably inserted into each slot. Thus, the number of shelves to be accommodated is increased/decreased in accordance with an increase/decrease in the number of subscribers.

Still additionally, in general, since a rack is located in a hired portion of a floor of a station, there is a need to reduce the occupying area of a bottom surface of the rack. For this reason, in many cases, a plurality of shelves are stored in a rack in a state arranged in a line. Yet additionally, for increasing the number of shelves (mounting density) storable in one rack, there is a need to achieve the size reduction of the rack and the shelf since limitation is imposed on the vertical width of each shelf. The size of the rack, the diametrical size of a fixing bolt for the shelves to be mounted on the rack and the location spacing between the positions of bolts and between the shelves have been determined according to the engineering specifications such as JIS (Japanese Industrial Standards) and EIA (Electronic Industries Alliance: U.S. Electronic Industrial society), and in the columns of the rack, bolt-fixing holes are previously made at an interval standardized.

FIG. 15 is a front perspective view showing a common shelf, and shows a front surface (surface a) of the shelf. In FIG. 15, a shelf 100 is for conducting interface processing on k (k designates a natural number; for example, k=4) optical cables concentrated, and it includes access panel units (access panels) 110, 111, 120, 130, 140, units A, B for generating cooling air to cool the shelf 100, an extra-portion handling panel 200 for looping extra portions of optical cables 9, and a cable support (cable supporting tool) 250 for maintaining the optical cables 9, connected to the access panel units 110, 120, 130 and 140, in a substantially horizontal condition. In this case, the cable extra portion signifies an unnecessary or redundant portion of the overall length of the optical cable 9.

Each of the access panel units 110 to 140 internally stores a printed board connected to one optical cable 9 for, for example, terminating an optical signal, a packet signal or the like, and carries out the collective hardwiring, repeating and others. Each of the access panel units 110 to 140 has, as one example, a box-like configuration and has a thickness small in vertical directions and further has a depth almost equal to the depth of an armored body (for example, metal body) of the shelf 100. Moreover, each of the access panel units 110 to 140 is inserted into a socket (or slot) of a back board placed on a back surface side in the interior of the shelf 100 so that electric connections are made between the access panel units 110 to 140. The horizontal length (width) of the access panel units 110 and 111 are half the horizontal length of the access panel units 120 to 140. The manufacturer of the shelf 100 designs or changes the size of the shelf 100 to be accommodated in a rack according to the above-mentioned engineering specifications for the rack. The shelf 100 shown in FIG. 15 mixedly stores two types of access panel units having different horizontal lengths.

Furthermore, in each of the units A and B in FIG. 15, for example, three cooling fans are disposed in an up-and-down direction (vertical direction) on the back side of a front panel to generate cooling air for cooling the access panel units 110 to 140.

The extra-portion handling panel 200 is made such that, for example, the three optical cables 9 connected to the access panel units 120 to 140 are wound thereon and the wound optical cables 9 are fixedly secured onto a front surface thereof. The vertical length of this extra-portion handling panel 200 is added to the vertical length of one shelf 100, and the vertical length after the addition is handled as a vertical length of an extra-portion handling area. The optical cables 9 from the access panel units 120 to 140 on the unit B side are disposed to suspend downwardly for avoiding the intersections with the unit B before connected to the extra-portion handling panel 200.

The four optical cables 9 supported by the cable support 250 are wired so as to cross in front of the units A, B, and are connected to the access panel units 110, 111, 120, 130 and 140 in a state located to intersect with the surfaces a, b of the units A, B. Moreover, the optical cables 9 supported by the uppermost portion of the cable support 250 are branched and the optical cable 9 at the uppermost portion thereof after branched pass through an outer frame of the shelf body to be connected to the access panel unit 111 so as to avoid a front portion of the access panel unit 110.

With respect to the cable extra-portion handling, various techniques have been proposed so far (for example, Japanese Patent No. 2909803 and Japanese Patent Laid-Open No. 2000-147269).

Japanese Patent No. 2909803 discloses a subrack having, on its upper surface, an optical connector accommodating box composed of an optical fiber holding section for holding an optical fiber in a state connected to an optical connector and wound and an optical connector holding section for holding a plurality of optical connectors in a state arranged in line wherein, when the optical connector holding section is drawn out in a sliding manner, it rotates around a rear end portion of the optical connector holding section to incline.

This facilitates the removal and accommodation of an optical connector even in a small space. Moreover, since an extra optical fiber portion is held in a state wound on the optical fiber holding section, even in a case in which the distance from an external unit is short, the optical fiber is easily retainable.

On the other hand, in an electronic apparatus disclosed in Japanese Patent Laid-Open No. 2000-147269, an optical connector connecting section for the connection of an optical connector of an external optical fiber is disposed on an apparatus front surface side in an inclination direction of a plane so that the optical connector is detachable in the inclination direction from the apparatus front surface side with respect to the optical connector connecting section.

However, each of the four optical cables 9 respectively connected to the access panel units 110 to 140 (see FIG. 15) passes by the front surface of the unit A and intersects with the drawing direction of the unit A. Accordingly, difficulty is encountered in drawing out the unit A from the shelf 100.

Although it can be considered that the four optical cables 9 take a roundabout route so as not to intersect with the drawing direction of the unit A, this is difficult because there are the limitations on the bending radius of the optical cables 9.

This is because, when the optical cable 9 takes an upward or downward roundabout route with respect to the shelf 100, the vertical occupying range of the shelf 100 increases, which decreases the number of shelves to be mounted in one rack. Moreover, a method of shortening the roundabout route length is unemployable because the bending radius of the optical cable 9 becomes smaller than the allowable bending radius (for example, R30).

In addition, a roundabout route of the optical cable 9 in the drawing direction of the unit A is also unemployable because the bending radius becomes smaller at the U-turn portion of the optical cable 9. Still additionally, it is unemployable because, when the optical cable 9 is led onto a surface of the extra-portion handling panel 200, difficulty is experienced in inserting the access panel units 120 to 140 in an upside direction of the extra-portion handling panel 200.

Therefore, the method of using a roundabout route extremely reduces the shelf mounting density per rack and makes it difficult to set the bending radius of the optical cable 9 at a value below the allowable bending radius, thereby extremely lowering the degree of freedom on wiring.

Still additionally, the method of using the extra-portion handling area requires an extra-portion handling operation for each shelf 100, which makes it difficult to efficiently mount a plurality of shelves 100 in one rack, thus leading to a disadvantage in terms of mounting density per rack.

Yet additionally, when the units A and B are forcibly drawn out from the shelf 100, difficulty is experienced in exhibiting the performance of the optical cable 9 sufficiently.

Moreover, the laying of the optical cable 9 requires an extremely special devices and a repairing operation asks an operator for a high skill and, hence, a quick repairing operation becomes difficult and a high repairing cost becomes necessary, which can result in the suspension of operations of the optical transmission network.

Still moreover, also in audio/visual equipment, the wiring of signal cables can intersect with other units such as amplifier and media player. This also suffer problems similar to those mentioned above.

SUMMARY OF THE INVENTION

The present invention has been developed with a view to eliminating these problems, and it is therefore an object of the invention to provide a structured shelf capable of inserting/removing units connected to a plurality of cables each having a limitation on bending radius and of conducting extra-cable handling within a limited spatial range, inserting/removing a desired unit into/from a shelf in a state where a cable is in an active condition and improving a shelf mounting density per rack.

For this purpose, in accordance with an aspect of the present invention, there is provided a structured shelf comprising a shelf body in which a first opening portion for insertion/removal of a first unit connected to a cable and a second opening portion for insertion/removal of a second unit having a predetermined function are formed in a predetermined surface portion, an extra-cable looping device on which an extra portion of the cable is wound, and a moving mechanism for moving the extra-cable looping device so as to avoid a space to be occupied by the second unit in a state removed from the second opening portion.

Thus, in the case of the employment of a plurality of cables each having limitation on bending radius, the extra-cable handling becomes feasible within a limited spatial range.

As mentioned above, the extra-cable handling becomes feasible within a limited spatial range even in the case of the employment of a plurality of cables each having limitation on bending radius, thereby improving the reliability of a shelf based on the shelf structure and a rack and considerably reducing the maintenance job for a large number of shelves provided in a large number of optical transmission stations of an optical transmission network.

In this case, it is also appropriate that the moving mechanism includes an openable/closable member rotatable around its one side portion or one end portion attached onto a surface portion constituting a margin (edge) portion of the second opening portion closer to the first opening portion.

This enables a desired unit to be inserted/removed into/from a shelf in a state where a cable is in an active condition so that various works and operations can be conducted without suspending the first and second units which are in operation, thereby enhancing the working efficiency considerably. Accordingly, a cooling unit becomes operable at all times, thus enhancing the stability of the operation of each shelf.

In addition, it is also appropriate that the extra-cable looping device is fixedly secured to the openable/closable member.

This can provide a bending radius larger than an allowable bending radius.

Still additionally, it is also appropriate that a damper mechanism is provided in the openable/closable member. Thus, abrupt openings/closures of the openable/closable member is avoidable, thus preventing the occurrence of vibrations and reducing the damages to the member.

Yet additionally, it is also appropriate that a plurality of through-holes are made therein. This can keep the air permeability so that the extra-cable handling can be conducted without interfering with air intake or exhaust.

Moreover, it is also appropriate that the openable/closable member is constructed as an openable/closable member having a configuration raised outwardly with respect to the second opening portion. This can prevent the damages to the cable due to abrupt openings/closures.

Still moreover, it is also appropriate that the openable/closable member is made using a mesh-like member. This can maintain the air permeability so that the extra-cable handling can be conducted without interfering with air intake or exhaust even in a state where the openable/closable member is covered due to the extra-cable handling.

Preferably, the cable is a cable for signal transmission.

Thus, the openable/closable member can provide a predetermined extra-portion handling radius as an allowable bending radius of the optical cable.

Furthermore, in accordance with another aspect of the present invention, there is provided a structured shelf comprising a shelf body in which a plurality of first opening portions each for insertion/removal of a first unit connected to a cable are formed in parallel with a desired surface portion and a second opening portion into/from which a second unit having a predetermined function is inserted/removed in a direction of intersecting with the first unit at a position adjacent to the plurality of first opening portions is formed in the surface portion, an openable/closable member rotatable around its one side portion or one end portion attached onto a surface portion constituting a margin (edge) portion of the second opening portion closer to the first opening portions, and an extra-cable looping device fixedly secured to the openable/closable member for looping an extra portion of the cable thereon.

This enables a desired unit to be inserted/removed into/from the shelf in a state where the cable is in an active condition so that various works and operations can be conducted without suspending the first and second units which are in operation, thereby enhancing the working efficiency considerably.

Still furthermore, in accordance with another aspect of the present invention, there is provided a structured shelf comprising a shelf body in which a first opening portion for insertion/removal of an access panel unit connected to an optical cable and a second opening portion for insertion/removal of a functional unit having a predetermined function including at least a cooling function and a power supply function are formed in a predetermined surface portion, an extra-cable looping device on which an extra portion of the optical cable is wound, and a moving mechanism for moving the extra-cable looping device so as to avoid a space to be occupied by the functional unit in a state removed from the second opening portion.

This can improve a shelf mounting density per rack, thus increasing the number of subscribers.

In addition, in accordance with a further aspect of the present invention, there is provided a structured shelf comprising a shelf body in which a plurality of first opening portions each for insertion/removal of a first unit connected to an optical cable are formed in parallel with a desired surface portion and a second opening portion into/from which a second unit having a predetermined function is inserted/removed in a direction of the intersection with the first unit at a position adjacent to the plurality of first opening portions, an openable/closable member rotatable around its one side portion or one end portion attached onto a surface portion forming a margin (edge) portion of the second opening portion closer to the first opening portions, and an extra-cable looping device fixedly secured to the openable/closable member for looping an extra portion of the cable thereon.

This can improve a shelf mounting density per rack, thus increasing the number of subscribers. For example, even in a case in which the minimum bending radius of the cable is large, the hardwiring handling in a room and the size reduction of in-room equipment are promotable.

This can maintain a state that the bending radius of the cable is larger than an allowable bending radius.

Moreover, it is also appropriate that the cable is fixedly secured to the surface portion and the openable/closable member so that a transient disposition portion from a disposition portion of the cable on the surface portion to a disposition portion thereof on the openable/closable member has a bending radius larger than an allowable bending radius of the cable.

This can fix both ends of the transient disposition portion without fixing the transient disposition portion.

Moreover, this permits the movement of the extra-cable looping function in a state where the bending radius of the cable is larger than the allowable bending radius.

BRIEF DESCRIPTION OF THE DRAWINGS

FIG. 13 is a front perspective view illustratively showing a shelf according to a second embodiment of the present invention;

FIG. 14A is an illustration useful for explaining an air passage according to the second embodiment of the present invention;

FIG. 14B is a front-elevational view showing a shelf according to the second embodiment of the present invention.

DESCRIPTION OF THE PREFERRED EMBODIMENTS

Embodiments of the present invention will be described hereinbelow with reference to the drawings.

(A) Description of First Embodiment of the Present Invention

A structured shelf according to the present invention is mounted in, for example, each station of an optical transmission network or one or a plurality of line accommodating units (each of which will hereinafter be referred to as a shelf unless otherwise specified particularly) provided in an in-like amplifier. Each shelf is for conducting interface processing on various types of transmission signals such as optical signal, packet signal and subscriber's line signal. Concretely, it is designed to carry out optical signal processing (physical processing including optical demultiplexing, optical multiplexing and optical amplification), termination processing (optical-electrical mutual conversion, and others), transfer processing (packet transmission/reception, packet multiplexing/demultiplexing, and others) and mutual format conversion in each line, and other processing. In each station, a plurality of shelves are stored in one rack for accommodating a large number of subscribers.

Figure 1:
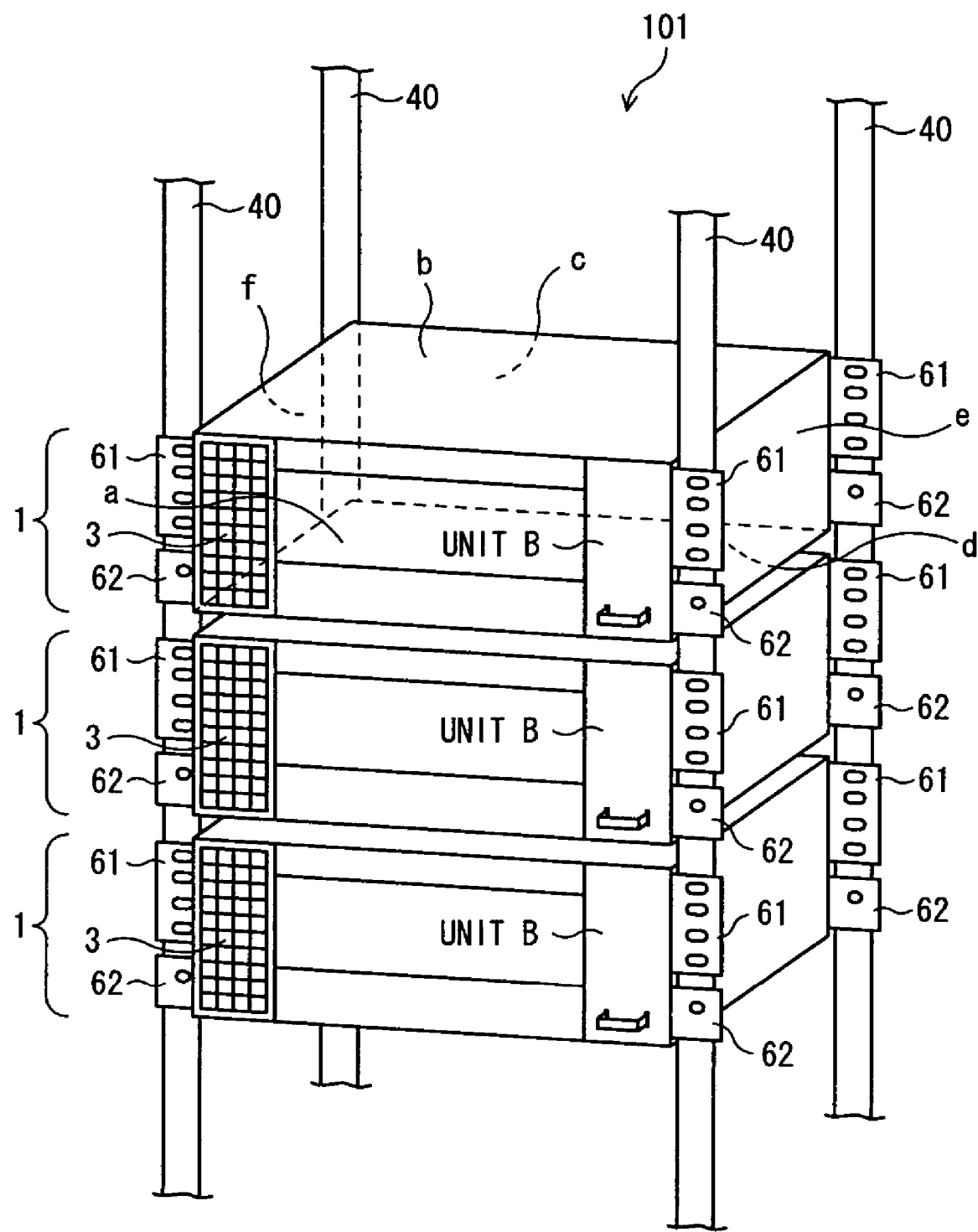
FIG. 1 is a perspective view illustratively showing a rack according to a first embodiment of the present invention.

FIG. 1 is a perspective view illustratively showing a rack according to a first embodiment of the present invention, and shows an appearance in a state where no optical cable is wired therein. In a rack 101 shown in FIG. 1, for example, three box-like shelves (each of which is referred to equally as frame, unit frame or rack mounted shelf) 1 are fixedly secured onto four columns 40 through the use of L-shaped fittings (fixtures) 61 and 62 and stored in tandem along a vertical direction. Each of the shelves 1 has six surfaces a, b, c, d, e and f. The surface (surface portion) a is a front face or panel front surface where operations are conducted for insertion/removal of an access panel unit or the like for line accommodation which will be mentioned later. The surface c is a back surface, and a circuit substrate(s) (not shown) is vertically set on the rear surface side of the surface c. This circuit substrate is for making communications with a line side in the exterior of the rack 101 and each access panel unit in the interior of the rack 101. Moreover, the surface c has a plurality of sockets which are made to engage with plugs, connectors and others fitted on access panel units to be inserted into the shelf 1, printed boards and others. The surfaces b and d are a top surface and a bottom surface, respectively, and the surfaces e and f are a right-hand surface and a left-hand surface, respectively. In the following description, the names of these surfaces will be used in same meanings.

Meanwhile, for the purpose of increasing the number of subscriber's lines to be accommodated or handled by one rack 101, a plurality of shelves 1 are mounted in the rack 1 at a high density, and JIS, EIA and others determine the size of each rack 101, the diametrical size of fixing bolts for the shelf 1 to be mounted in the rack 1, the positions of the bolts, and others. For example, the location interval between the adjacent shelves 1 is prescribed, for example, in a mounting state where the shelves 1 are disposed in two racks 101, and bolt-fixing holes and others are previously made in the columns 40 of the racks 101 at the prescribed interval. For example, the vertical distance (height) between the shelves 1, the vertical length occupied by the each shelf 1 and the 1U (1 unit size) are prescribed as basic sizes, and the location interval between the adjacent shelves is prescribed at a concrete value (for example, 50 mm or 45.5 mm).

Meanwhile, a manufacturer of the shelf 1 can determine the size of each shelf 1 and others so as to conform to these engineering specifications. The vertically protruding lengths of a control panel, an extra-cable handling panel, a connector and others belonging to each shelf 1 are added to the vertical lengths of the shelves 1, and the vertical length of each shelf 1 is limited to be below a predetermined value. Therefore, each shelf 1 is designed so that the attachments do not exceed a predetermined vertical length, thus accomplishing the high-density mounting. Moreover, marks representing the vertical lengths of the shelves 1, the location interval therebetween and others are formed on the four columns 40, and L-shaped fittings 61, 62 and bolt-fixing holes are previously made as joint members whereby the surface a of the shelf 1 is attached to the columns 40.

Since the rack 101 is usually installed at a floor wall side position of a station, when access panel units for line accommodation, which will be mentioned later, are drawn out from the rack 101, an operator is required to work at any one (in this case front surface) of insertion/removal surfaces. In this case, with respect to each access panel unit and the units A and B, each access panel unit is drawn out from the front surface of the shelf 1 or the rack 101.

Figure 2A:
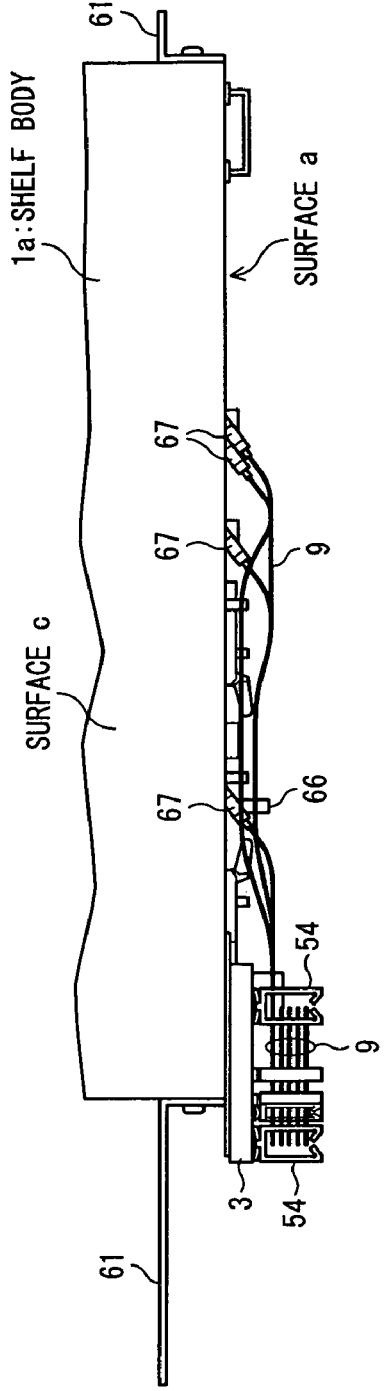
FIG. 2A is a partial top view showing a shelf according to the first embodiment of the present invention.
Figure 2B:
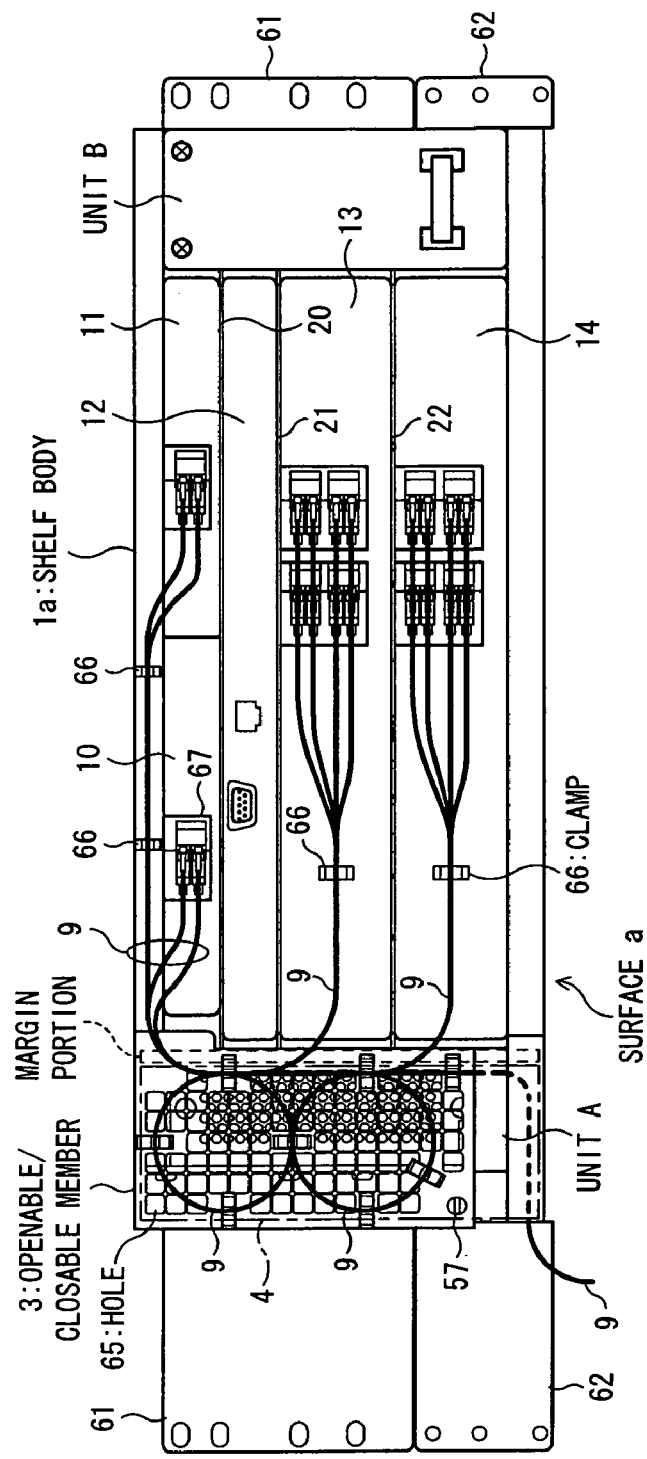
FIG. 2B is a front elevational view showing the same shelf according to the first embodiment of the present invention.

FIGS. 2A and 2B show a state in which access panel units for line accommodation, cooling units, an openable/closable member and optical cables are mounted on the surface a of each shelf 1 located in this way.

FIG. 2A is a partial top view (surface c) of the shelf 1 according to the first embodiment of the present invention, and FIG. 2B is a front-elevational view (surface a) showing the same shelf 1. In these illustrations, the parts marked with the same reference numerals as those used above have functions identical or similar to those of the above-mentioned parts. In the shelf 1 shown in FIGS. 2A and 2B, access panel units 10, 11 inserted into an upper stage of the surface a and an openable/closable member 3 which will be mentioned later are connected through optical cables 9 which are transmission cables.

In this case, one end portions of the optical cables 9 shown in FIG. 2A are connected to optical connectors 67, provided in surface a sides of the access panel units 10 and 11, through clamps (hardwiring-holding members) 66 whereby the hardwiring is made almost horizontally on the surface a, while the other end portions of the optical cables 9 are concentrated through a plurality of clips or clamps 54 fitted to the openable/closable member 3. Moreover, the optical cables 9 are wound around the clips 54 several times, which provides a function as an extra-cable looping device 4 shown in FIG. 2B. In this case, the extra cable signifies an unnecessary or redundant cable portion of the overall length of the optical cable 9.

On the other hand, the appearance viewed from the surface "a" side of the shelf 1 is shown in FIG. 2B. The shelf 1 shown in FIG. 2B is equipped with a shelf body 1a, access panel units 10, 11, 13, 14, an LAN (Local Area Network) board 12, the unit B, the openable/closable member 3 and the unit A located in a deeper side of the openable/closable member 3.

Each of the access panel units 10, 11, 13 and 14 is connected to one (or more-than-two) optical cable 9 for conducting the interface processing such as concentration, hardwiring, branch, connection, termination, amplification, repeating and others with respect to optical signals, packet signals and other signals. It internally includes a printed board.

Figure 3A:
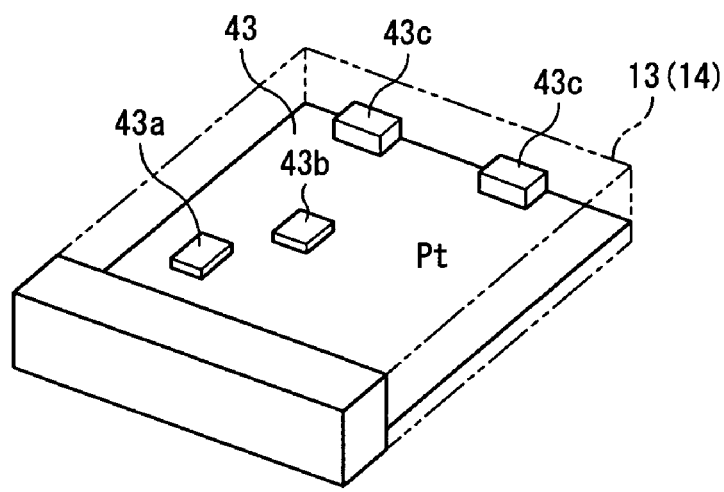
FIGS. 3A and 3B are illustrative views showing an access panel unit according to the first embodiment of the present invention.

FIG. 3A is an illustrative view showing the access panel unit 13 according to the first embodiment of the present invention. The access panel unit 13 shown in FIG. 3A includes a printed board (designated at Pt) 43 covered with an armoring member (portion denoted by broken lines), and this printed board 43 is equipped with an optical IC (Integrated Circuit) 43a for termination of an optical signal, an electronic circuit 43b for processing on an electric signal, and others. In addition, a plurality of sockets 43c for connections with optical connectors and electric connectors, and others, are fixedly secured to an end portion of the printed board 43. Thus, the printed board 43 is electrically connected to an external circuit to carry out mutual optical-electrical conversions, various types of signal processing and others. The access panel unit 14 has an interface processing function almost identical to that of the access panel unit 13, and the description thereof will be omitted for avoiding the repeated explanation.

Furthermore, in FIG. 2B, the LAN board 12 is for transferring electric packets, and connection devices such as a LAN cable socket are set on the surface a.

Figure 3B:
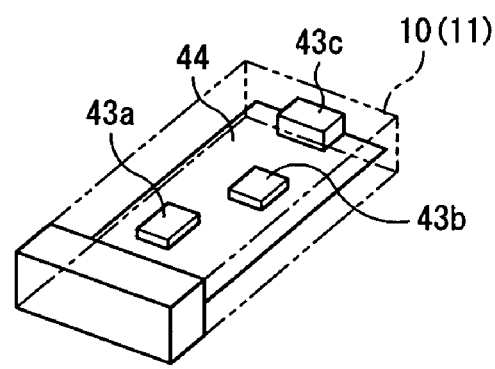

FIG. 3B is an illustrative view showing the access panel unit 10 according to the first embodiment of the present invention. The access panel unit 10 shown in FIG. 3B is equipped with a printed board 44 having a function (for example, packet processing ability) equivalent to that of the printed board 43, and it has a function almost identical to that of the access panel unit 13. The horizontal length itself of the access panel unit 10 can be designed and changed by a manufacturer, and the size reduction of the access panel unit 10 can enhance the mounting density of the shelves 1 mountable in the rack 101. As one example, the horizontal size of the access panel unit 10 is approximately the half the horizontal size of the access panel unit 13. The access panel unit 11 is the same as the access panel unit 10, and the description thereof is omitted for avoiding the repeated explanation.

Incidentally, it is also acceptable that, in place of the half-size access panel units 10 and 11, any one of the ordinary-size access panel units 13 and 14 is mounted in the space occupied by the two access panel units 10 and 11 in the interior of the shelf body 1a.

Thus, for example, the optical and electric transmission signals inputted to the shelf 1 undergo the interface processing such as termination, transfer and multiplexing/demultiplexing in the access panel units 10, 11, 13 and 14, which realizes the functions of the shelf 1.

Figure 4:
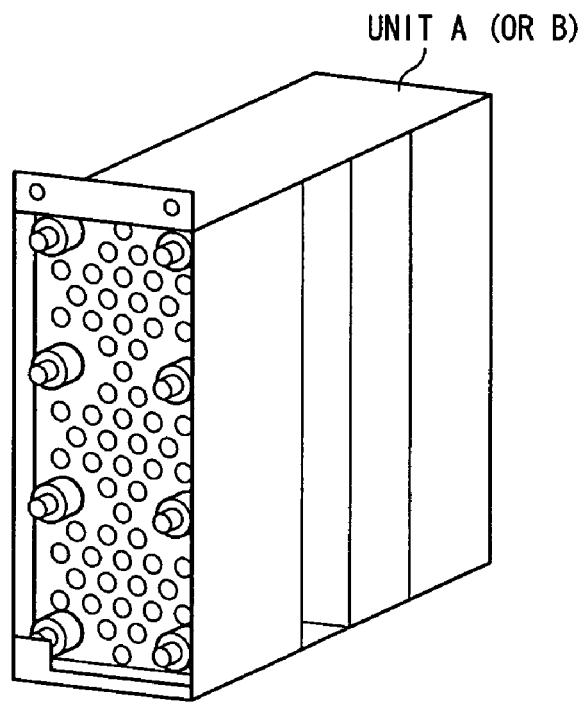
FIG. 4 is an outside view showing a cooling unit according to the first embodiment of the present invention.

Each of the units A and B shown in FIG. 2B serves as a cooling unit, the appearance of which is shown in FIG. 4. The unit A shown in FIG. 4 has a vertical length almost equal to that of the shelf 1 and, for example, three cooling fans (not shown) are attached to a rear side relative to the front surface of the unit A along a vertical direction, and a large number of air holes are made therein so that filtered are foreign matters such as dusts contained in intake air.

In addition to this cooling function, the unit A has a power supply function for supplying power (or a voltage) to each cooling fan and each portion of the shelf 1. Moreover, the unit A can also carry various types of media recording/reproducing apparatus such as CD-ROM (Compact Disc-Read Only Memory) and CD-RW (Compact Disc Rewritable) which can provide a database function to the shelf 1 so that, for example, traffic data and others are manageable. Alternatively, the unit A can carry an extension memory. The function and structure of the unit B are almost identical to those of the unit A, and the description thereof will be omitted for avoiding the repeated explanation.

Moreover, the number of cooling fans and the vertical/horizontal locations are diversely changeable. By reversing the rotating direction of the cooling fans of each of the units A and B, the air flowing direction can be changed in a direction from the unit B to the unit A.

Figure 5:
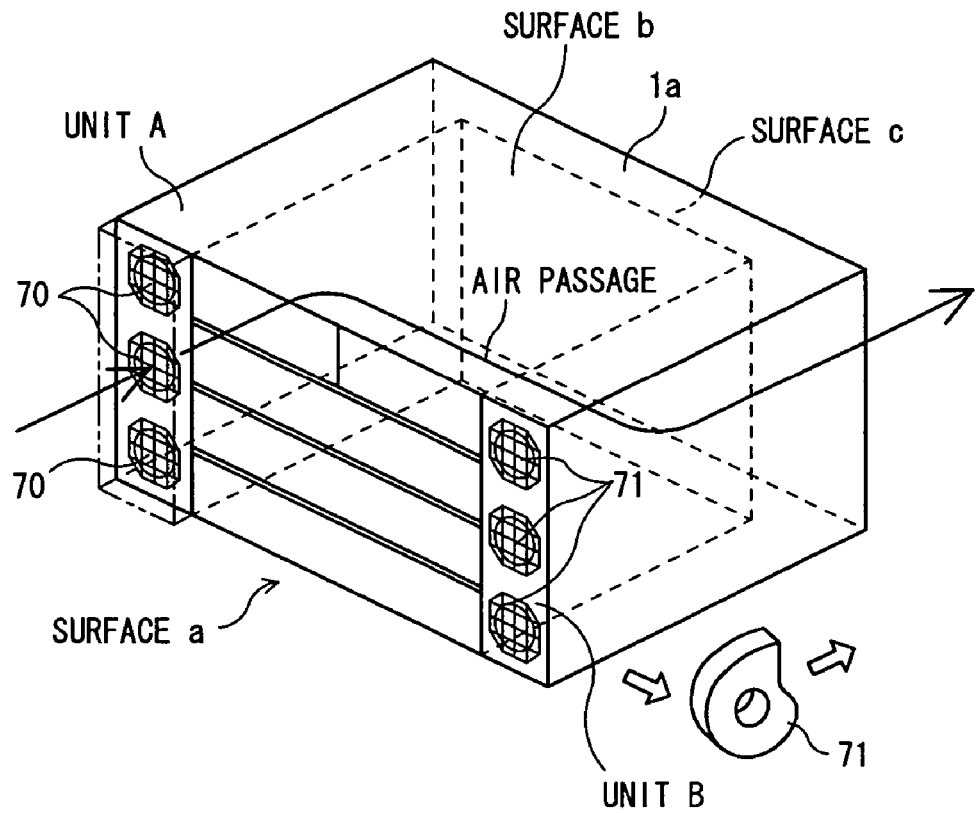
FIG. 5 is an illustration useful for explaining an air passage for cooling air according to the first embodiment of the present invention.

FIG. 5 is an illustration useful for explaining a cooling air passage according to the first embodiment of the present invention. The cooling air is produced by three cooling fans 70 of the unit A shown in FIG. 5. In this case, the air passage for the cooling air produced by the intermediate cooling fan 70 of the three cooling fans 70 is bent in the interior of the shelf 1 to cool the interior of the shelf 1 and the access panel units 10 to 14. The cooling air is discharged through a back surface of the unit B. Since this bending enhances the ventilation resistance and the heat generation quantity, it is preferable that the unit B uses, for example, a blower fan 71 (blowing from the unit B in the illustration). This blower fan 71 takes in cooling air in a side surface direction and exhausts it in a front surface direction, with the air passage being placed into a bent state. A detachable filter is provided in the vicinity of each of the units A and B in the air passage direction or in a deep side of the shelf 1 so as to prevent the adhesion and build-up of dusts stemming from the intake air.

In the shelf body 1a shown in FIGS. 2A and 2B, opening portions (first opening portion) for the insertion/removal of the access panel units 10 to 14 connected to the optical cables 9 and an opening portion (second opening portion) for the insertion/removal of the cooling unit A are made in the surface a.

Figure 6:
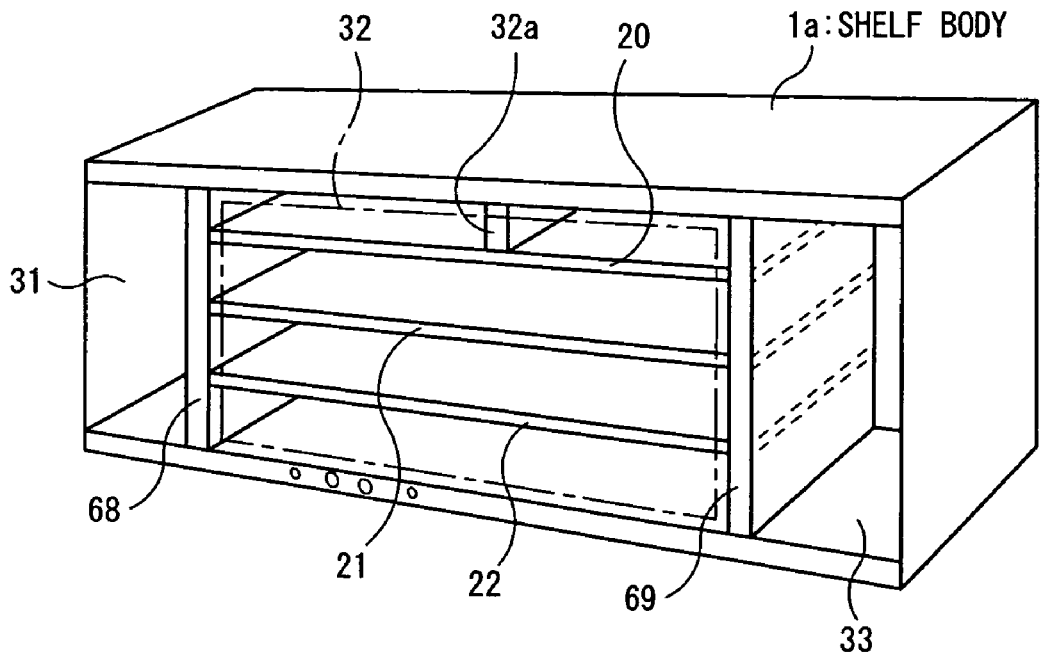
FIG. 6 is a perspective view showing a shelf body according to the first embodiment of the present invention.

FIG. 6 is a perspective view showing the shelf body 1a according to the first embodiment of the present invention. The shelf body 1a having a box-like configuration, shown in FIG. 6, is made up of, for example, a hollow casing member, and when the contents (the access panel unit 10 and others shown in FIG. 2B and in the other illustrations) are inserted into the hollow portion, it functions as a frame. Moreover, barrier members 68 and 69 are provided in the interior of the shelf body 1a, thereby establishing three types of chambers (hollow portions) 31, 32 and 33. The cooling units A and B being put in the chambers 31 and 33 and, for example, three partition boards (metal plates) 20, 21 and 22 are set in the chamber 32 to be in parallel with the surface d (bottom surface: see FIG. 1), and the respective partition boards 20 to 22 are inserted into grooves (guide rails) made in wall surfaces of the barrier members 68 and 69 to be in parallel with the surface d, thereby establishing spaces for accommodating the access panel units 13, 14 and the LAN board 12. Moreover, the spaces for the half-size access panel units 10 and 11 are defined by a partition member 32a attached to the shelf body 1a, the uppermost partition board 20 and the partition boards 21, 22 attached to the vicinity of a central portion of a surface a side frame of the shelf body 1.

Incidentally, in FIG. 6, it is also acceptable that, in place of the employment of the partition boards 20 to 23, grooves (guide rails) are made at the aforesaid equal interval in the barrier members 68 and 69 and members having a long depth are formed at the aforesaid equal interval on side surface portions of the access panel units 10 to 14 so as to engage with the grooves, thus attaching the access panel units 10 to 14 to the shelf body 1a. A space for accommodating the access panel units 13, 14 and the LAN board 12 can be defined in this way.

Figure 7:
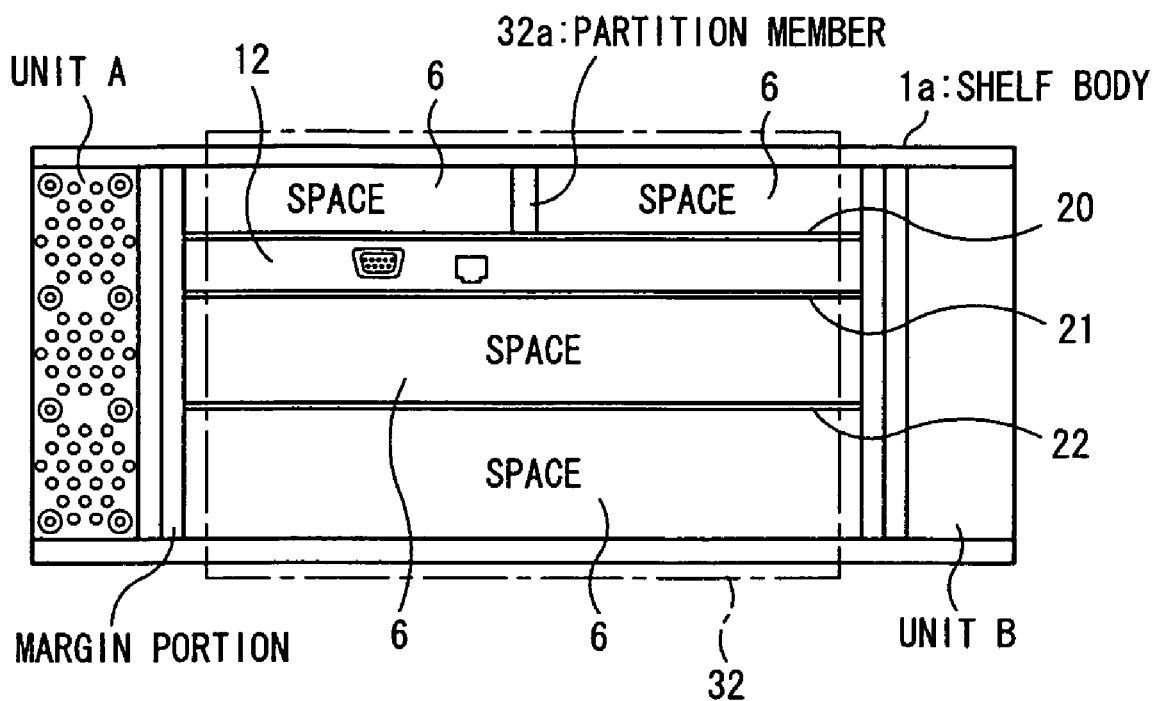
FIG. 7 is an illustration of one example of a first opening portion according to the first embodiment of the present invention.

FIG. 7 is an illustration of one example of first opening portions 6 according to the first embodiment of the present invention. As shown in FIG. 7, the LAN board 12 and the partition boards 20 to 22 are put in the chamber 32 of the shelf body 1a, and the space for the accommodation of the access panel units 10, 11, 13 and 14 respectively functions as the first opening portions 6.

Figure 8:
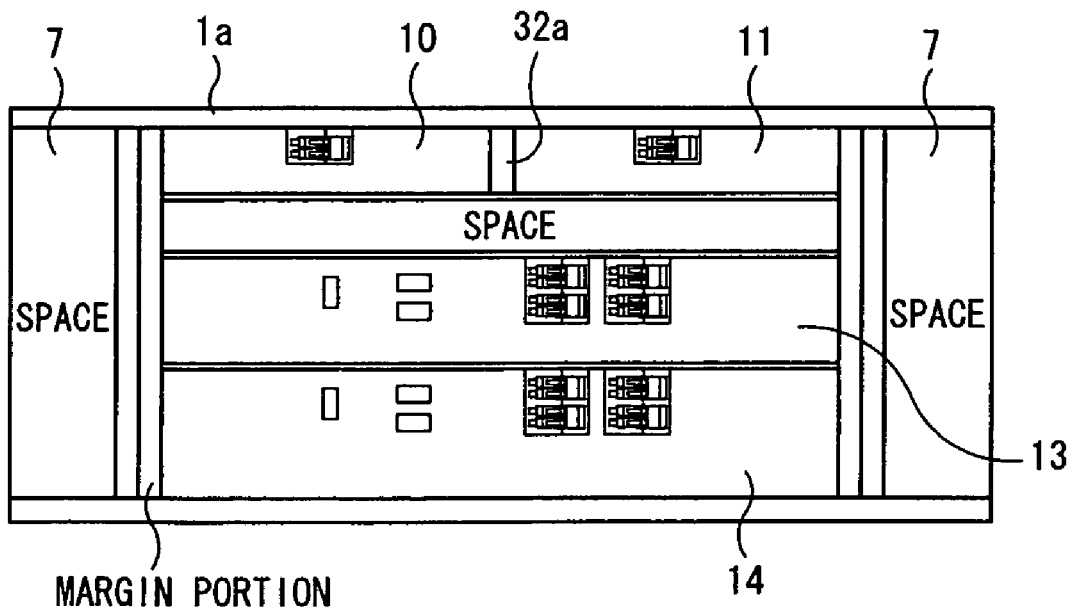
FIG. 8 is an illustration of one example of a second opening portion according to the first embodiment of the present invention.

On the other hand, FIG. 8 is an illustration of one example of second opening portions 7 according to the first embodiment of the present invention. As shown in FIG. 8, the units A and B are stored in the chambers 31 and 33 of the shelf body 1a, respectively, and a space for the storage of the units A and B respectively functions as the second opening portions 7.

As the manner of storing the first unit A and the second unit B in the free spaces shown in FIGS. 7 and 8, an extremely large number of types are provided depending upon combinations. Therefore, the present invention is not limited to the units A and B, but it is also applicable to diverse types.

Thus, the access panel unit 10 and others to be put in the interior of the shelf 1 can be inserted/removed into/from the second opening portions 7.

Secondly, a detailed description will be given hereinbelow of a case in which a moving mechanism and an extra-cable looping device 4 are provided on the surface a.

Figure 9:
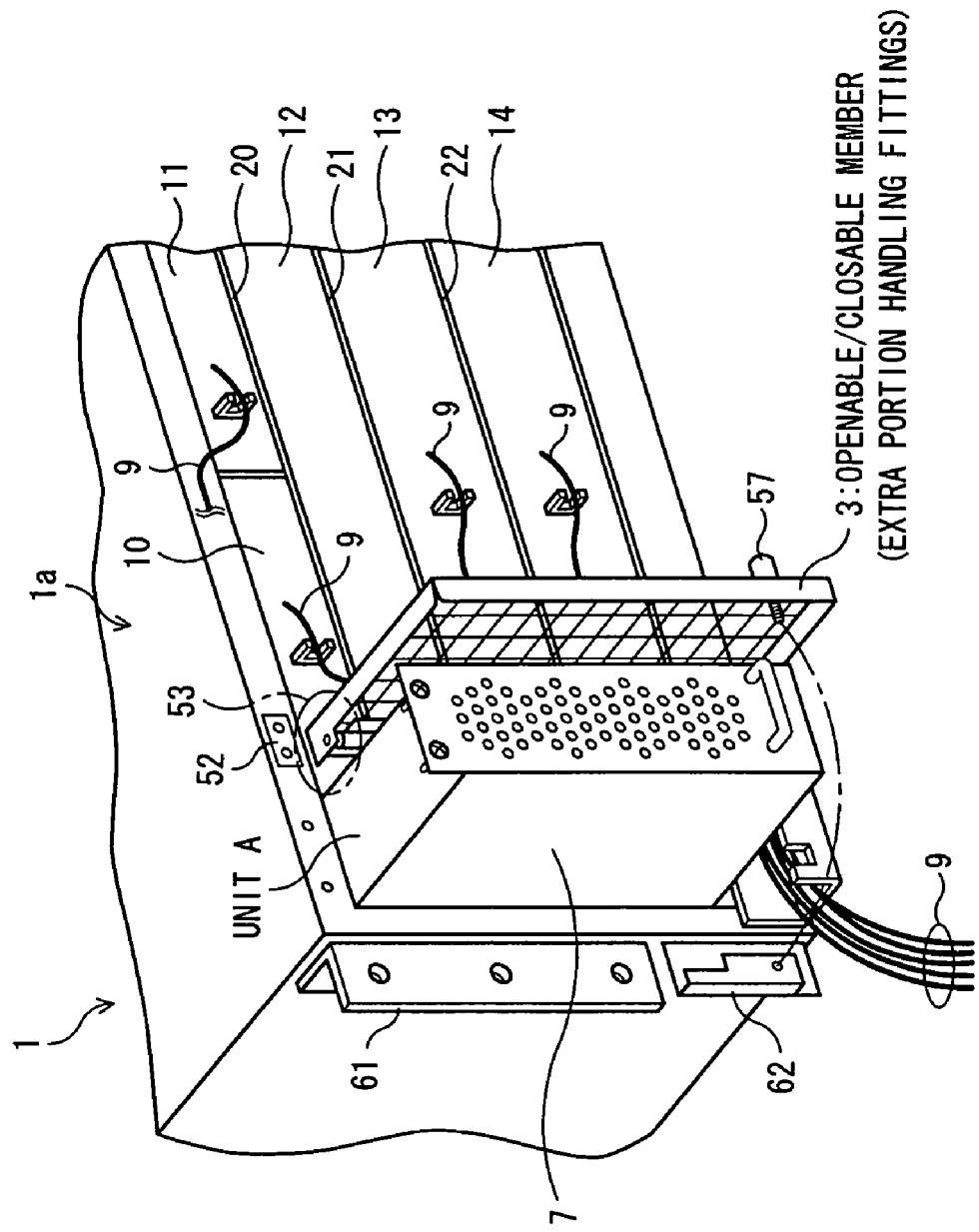
FIG. 9 is a front perspective view illustratively showing a shelf according to the first embodiment of the present invention.

FIG. 9 is a front perspective view illustratively showing the shelf 1 according to the first embodiment of the present invention. This shelf 1 shown in FIG. 9 is designed to concentrate n (n represents a natural number) optical cables 9 and conduct the interface processing, and the first opening portions 6 for the insertion/removal of the access panel units 10 to 14 connected to the optical cables 9 and the second opening portion 7 for the insertion/removal of the unit A having a cooling function are made in the same front surface a of the shelf body 1a, with the access panel units 10 to 14 and the cooling unit A being inserted thereinto. Although not illustrated, the unit B is also inserted/received into/from the second opening portion 7.

In addition to this, the shelf 1 is equipped with fasteners 52 fixed to a frame portion of the shelf body 1a, a shaft portion 53 screwed to the fasteners 52, and an openable/closable member (moving member) 3 screwed to the shaft portion 53. As one example, the opening/closure member 3 is a frame member with an edge, and a standing wall (metal wall) is mounted around the frame member and, inside the frame member, a large number of fine metal rods are disposed to intersect with each other in vertical and horizontal directions at an almost equal interval for a mesh-like configuration. Therefore, apparently, the openable/closable member 3 has a door-like configuration.

In this connection, the function of the openable/closable member 3 is achievable with a different shape. For example, an openable/closable member 3a shown in FIG. 10B is composed of a rod-like member (or flat-plate member) 3b set in a vertical direction and rod-like members (or flat-plate members) 3c fitted to several portions (in this case, three portions) of the rod-like member 3b positioned in the vertical direction so as to intersect with the rod-like member 3b. This enables an optical cable (s) 9 to be wound around the rod-like members 3a to 3c, thus functioning as an extra-cable looping device 4.

Figure 10A:
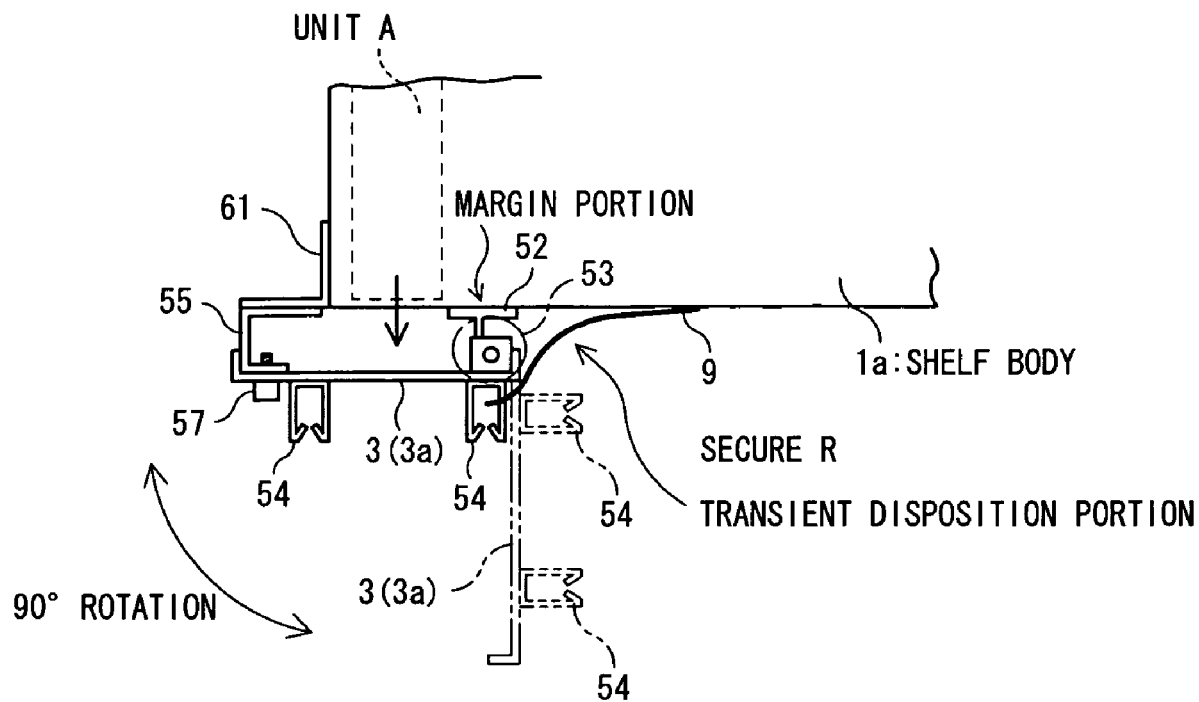
FIG. 10A is a top view illustratively showing a moving mechanism according to the first embodiment of the present invention.
Figure 10B:
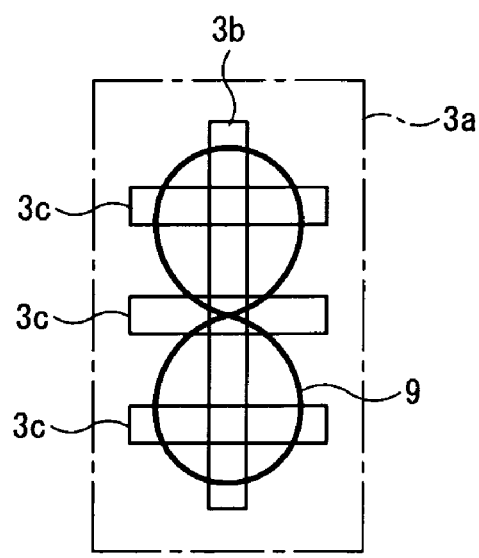
FIG. 10B is an illustration of an example of a different configuration of an openable/closable member according to the first embodiment of the present invention.

FIG. 10A is a top view illustratively showing a moving mechanism according to the first embodiment of the present invention. In FIG. 10A, the same reference numerals as those used above designate the same parts. As shown in FIG. 10A, on an openable/closable member 3, there are provided a plurality of clips 54 made to bundle (concentrate) optical cables 9. Moreover, a standing wall portion of the openable/closable member 3 at its one side portion is placed in a state hooked by a shaft portion 53, and the openable/closable member 3 is made to be rotatable around the shaft portion 53 within an angular range of approximately 90 degrees. In a state closed, the openable/closable member 3 is fastened through a screw 57 to an inverted J-shaped fixture (fittings) fixedly secured to an L-shaped fixture. That is, the openable/closable member 3 is constructed such that its one side portion (one side portion of the openable/closable member 3) is fitted to the surface a forming a margin (edge) portion of the insertion/removal opening for the unit A, closer to the insertion/removal openings for the access panel units 10, 11, 13 and 14, so that the openable/closable member 3 is rotatable about this one side portion. Moreover, the extra-cable looping device 4 is fixedly secured to the openable/closable member 3. In this case, owing to the interposition of the inverted J-shaped fixture 53 (and the shaft portion 53), a constant distance is kept between the openable/closable member 3 and the surface a of the shelf body 1.

A reason for keeping the distance is to set a bending radius R of the optical cable 9 at a value larger than an allowable bending radius. When the optical cable 9 is bent to make a sharp angle, no total reflection occurs in its internal core. In this case, with respect to the openable/closable member 3, for example, an extra-portion handling radius exceeding R30 is required as an allowable bending angle of the optical cable 9, and it is realizable by securing a width dimension of the openable/closable member 3. For each of the opening and closure of the openable/closable member 3, the bending radius R is designed so as not to be smaller than the allowable bending radius.

Therefore, in this structured shelf, a portion of the optical cable 9 coming to the openable/closable member 3 is fixedly secured to, for example, a portion of the surface a between the unit A and a left side of the access panel unit 10, and the optical cable 9 is fixedly secured to the surface a and the openable/closable member 3 so that a transient disposition portion of the optical cable 9 extending from a disposition portion on the surface a to a disposition portion on the openable/closable member 3 has a bending radius larger than the allowable bending radius of the optical cable 9. That is, the transient disposition portion is not fixed but both the end portions of the transient disposition portion are fixed thereto.

Thus, the openable/closable member 3, the shaft portion 53, the optical cable(s) 9 and the fittings cooperate with each other and function as a moving mechanism (3, 9, 53, 55). Moreover, the extra-cable looping function is movable in a state where the bending radius of the optical cable 9 is larger than the allowable bending radius.

In addition, the employment of the openable/closable member 3a shown in FIG. 10B is similar to the case of the openable/closable member 3. That is, the openable/closable member 3a is constructed such that its one end portion (one end portion of the rod-like member(s) 3c of the openable/closable member 3a) is fitted to the surface a forming a margin (edge) portion of the insertion/removal opening for the unit A, closer to the insertion/removal openings for the access panel units 10, 11, 13 and 14, so that the openable/closable member 3a is rotatable about this one end portion. Incidentally, FIG. 10B shows one example of structure, and the shapes of the fittings are diversely changeable.

Likewise, this enables the wound (looped) extra cable 9 to be moved in a state where the bending radius of the extra cable 9 is larger than the allowable bending radius.

In addition, the shelf 1 is constructed as a box-like shelf 1 in which the access panel unit 10 and others are mountable horizontally, and the units A and B which can be inserted/removed are mounted in a state arranged at right and left positions, and the extra-cable handling openable/closable member 3 (or 3a) openable and closable according to rotation is provided in front of the unit A. Moreover, the replacement of the units A and B, which are of detachable types and which are mounted at right and left positions in the front surface of the shelf 1, is feasible without making the interference with the hardwiring routes of the optical cables from the access panel unit 10 or the like to the other access panel unit 11 or the other shelf (shelves other than this shelf 1 shown in FIG. 1). Still additionally, the position of the axis of the rotational opening/closure is set at a predetermined position where a bending radius exceeding a prescribed allowable bending radius R is securable, and the clamps 54 are set on the surface a (front surface portion) or the interior of the access panel unit 10 or the like so that the optical cable 9 extending from the access panel unit 10 or the like mounted in each space does not interfere with the insertion/removal of the access panel unit 10 or the like which is inserted and mounted in a space above or below the access panel unit 10 or the like, and guide clamps 54 are also fitted onto the openable/closable member 3, made to handle the extra portions of the optical cables 9, at positions suitable for the fixing according to the lengths of the optical cables 9.

Therefore, the reliability of the shelf 1 and the rack 101 employing this shelf structure is improvable and, for example, in the case of optical transmissions, the trouble to be taken for the maintenance of a large number of shelves 1 provided in numerous optical transmission stations is considerably reducible.

With respect to the openable/closable member 3, with reference to FIGS. 2B, 7 and 8, this structured shelf is made up of the shelf body 1a in which a plurality of (for example, five) first opening portions 6 for the insertion/removal of the access panel units 10 to 14 connected to the optical cables 9 are made in parallel with, for example, the surface a and the second opening portion 7 for the insertion/removal of the cooling unit A in directions of intersecting with the access panel units 10 to 14 is made in the surface a at a position adjacent to the aforesaid five first opening portions 6, the openable/closable member 3 constructed such that its one side portion or its end portion is attached to the surface a forming a margin portion of the insertion/removal opening for the unit A closer to the insertion/removal openings for the access panel units 10, 11, 13 and 14 so that the openable/closable member 3 is rotatable around the one side portion or the one end portion, and the extra-cable looping device 4 fixedly secured to the openable/closable member 3 and used for the looping of an extra portion of the optical cable 9.

Figure 11A:
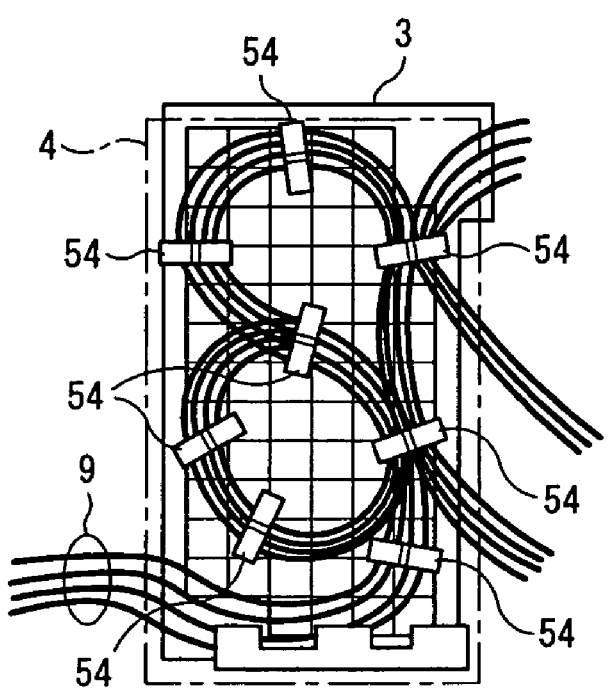
FIG. 11A is an illustration of a moving member and an integrated structure for extra-cable handling according to the first embodiment of the present invention.
Figure 11B:
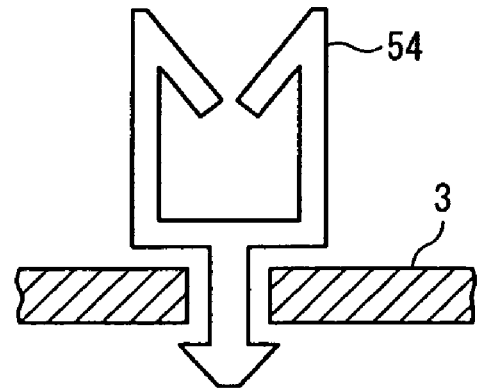
FIG. 11B is a cross-sectional view showing an example of attachment of a clamp according to the first embodiment of the present invention.

FIG. 11A is an illustration of an integrated structure of the openable/closable member 3 and the extra-cable looping device 4 according to the first embodiment of the present invention. As shown in FIG. 11A, a mesh-type door serving as the openable/closable member 3 and the extra-cable looping device 4 for the winding of the extra portion of the optical cable 9 are integrated with each other to combine the moving function depending on the door and the extra-cable looping function. Moreover, for example, as shown in FIG. 11B, each of the clips 54 is fixed to the openable/closable member 3 in a manner such that its leg portion is inserted into a hole made in the openable/closable member 3 and a protruding portion of the leg portion is hooked by the rear side of the openable/closable member 3. Accordingly, the openable/closable member 3 and a plurality of clips 54 cooperate with each other to function as the extra-cable looping device 4 (for example, see FIG. 3A). This extra-cable looping device 4 is made to hold the optical cable(s) 9 in a state where its bending radius is larger than an allowable bending radius. Thus, when the door portion of the openable/closable member 3 itself is placed into an opened state, the extra-cable looping device 4 is moved so as to avoid the space (including the interior of a space surrounded by the external shape of the cooling unit) occupied by the cooling unit A drawn out from the unit A insertion/removal opening. Incidentally, in the case of a relaxed limitation on the bending radius, it is also possible to bundle and hold the optical cables 9 in a manner other than the looping.

In addition, since the openable/closable member 3 shown in FIG. 9 has a mesh-like configuration, the air permeability is maintainable, and even if the openable/closable member 3 is put in a covered state due to the handling of the extra portions of the optical cables 9, the extra-cable handling becomes feasible without interfering with the air intake (or exhaust). Naturally, for the openable/closable member 3, it is also acceptable that a flat plate is used and a large number of through-holes are made in the flat plate.

Figure 12A:
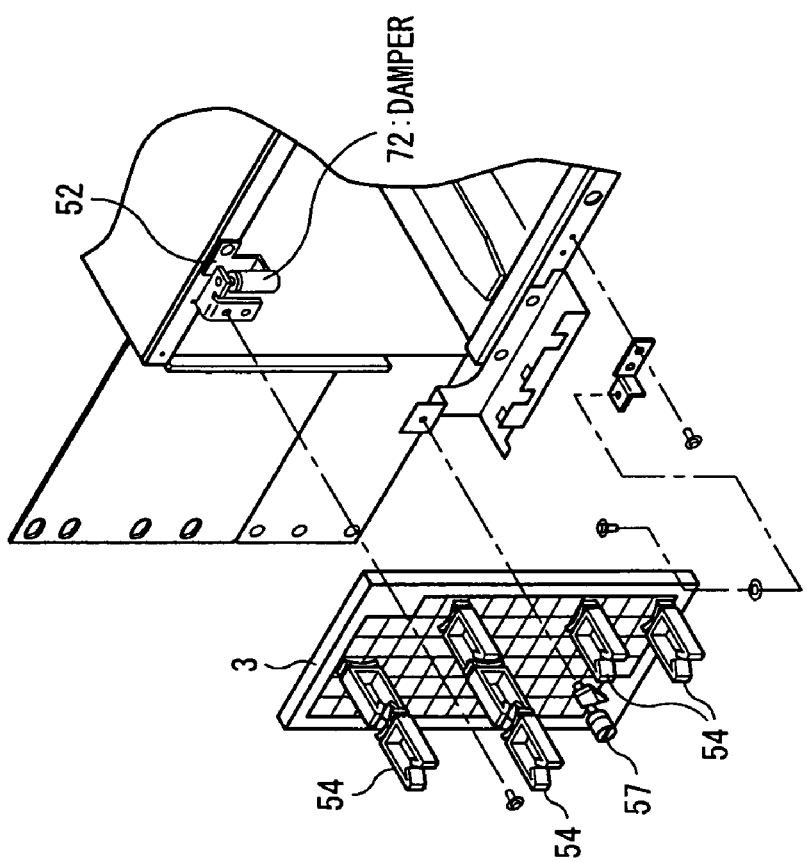
FIGS. 12A and 12B are exploded perspective views useful for explaining a procedure of attachment of an openable/closable member according to the first embodiment of the present invention.
Figure 12B:
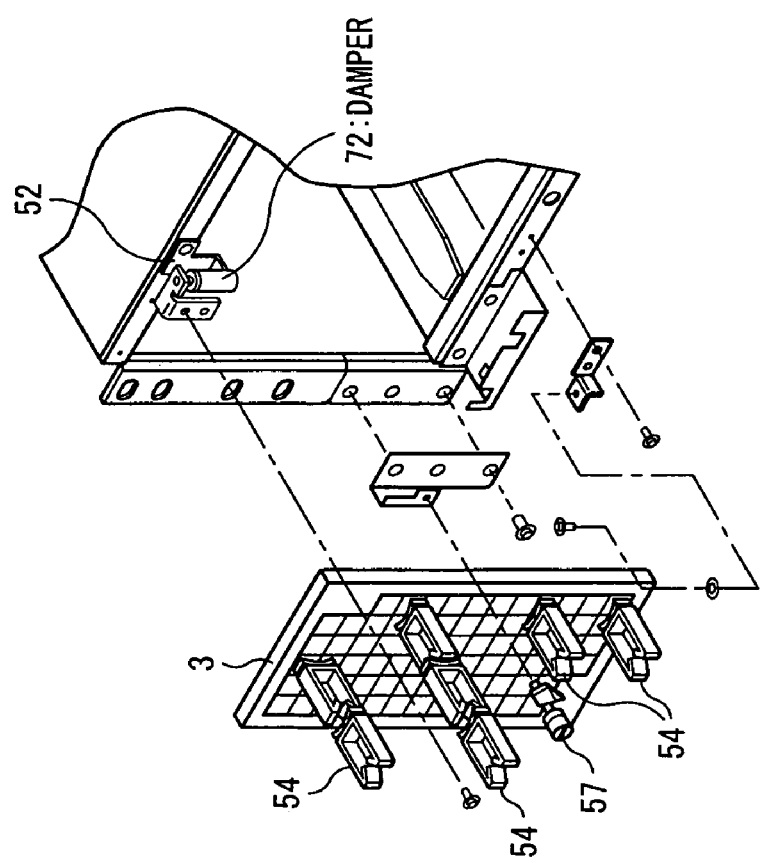
Figure 15:
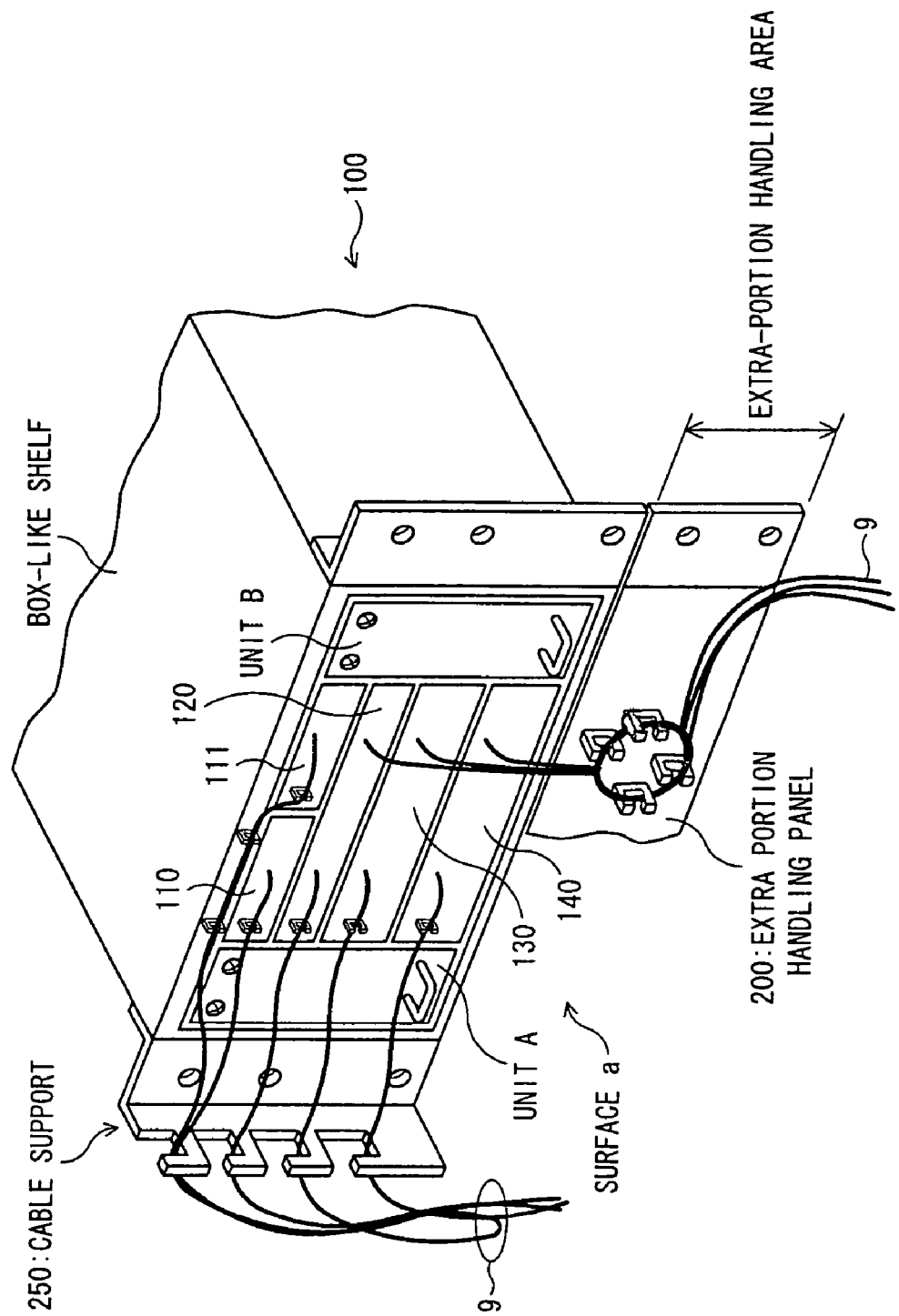
FIG. 15 is a front perspective view showing a common shelf.

FIGS. 12A and 12B are exploded perspective views useful for explaining a procedure of attachment of the openable/closable member 3 according to the first embodiment of the present invention. FIGS. 12A and 12B show the examples of the horizontal length of the L-shaped fitting (fixture) 61 being set at 19 inches and 23 inches. a damper (damper mechanism) 72 is additionally fitted to the openable/closable member 3. Owing to the employment of this damper 72, the abrupt opening/closure of the openable/closable member 3 is avoidable and the damages to the members are reducible because of no generation of vibrations.

Moreover, the axis of the damper 72 and the axis of the opening/closing shaft of the openable/closable member 3 coincide approximately with each other, and the damper 72 and the openable/closable member 3 are in a coaxial relation, which can make the opening/closing mechanism (moving mechanism) compacter.

Thus, with this structured shelf, even if the number of lines to be accommodated in the access panel unit 10 and others is large, such as several tens to several hundreds, they can be drawn out therefrom due to the occurrence of a trouble or the maintenance, which can provide a high working efficiency.

In addition, in a case in which the limitation on hardwiring for the bending radius of the optical cable 9 being made larger than an allowable bending radius is imposed on the shelf 1, not only the extra-cable handling becomes feasible within a limited spatial range, but also the cooling units A and B can be inserted/removed into/from the shelf 1 in a state where the optical cable 9 is active, and even the shelf 1 mounting density per rack 101 shown in FIG. 1 becomes improvable.

Still additionally, since the cooling units becomes operable at all times as mentioned above, the operational stability of each shelf increases. Yet additionally, for example, even in a case in which a minimum bending radius of an optical cable is large, the hardwiring handling in a room and the size reduction of in-room equipment are promotable.

(B) Description of Second Embodiment of the Present Invention

FIG. 13 is a front perspective view illustratively showing a shelf according to a second embodiment of the present invention. In a shelf 300 shown in FIG. 13, in place of the employment of the openable/closable members 3 and 3a shown in FIGS. 9 and 10B, an openable/closable member 5 is provided in front of a unit A to be openable and closable. This openable/closable member 5 is constructed as an openable/closable member having a convex configuration raised outwardly with respect to the second opening portion 7. That is, the openable/closable member 5 has a configuration inflated in the removing direction of the unit A. Moreover, a plurality of clips 54 are set on a surface of the openable/closable member 5.

In this case, the construction of the openable/closable member 5 being provided within a plane in the internal width range of the shelf set to be smaller than a prescribed horizontal length of the rack 101 (see FIG. 1) accommodating the shelf 1 leads directly to the restriction on the horizontal lengths of each access panel unit. Therefore, according to the second embodiment, the cross-sectional configuration of the openable/closable member 5 is formed into a V-like shape or U-like shape, and an opening/closing mechanism (moving mechanism) is realized through the use of this V-shaped member or a member with a different shape. Incidentally, configurations other than these V-like shape and U-like shape are also acceptable.

In addition, also in the second embodiment, as shown in FIGS. 12A and 12B, a damper structure is additionally attached to the rotary shaft portion made by various types of fittings constituting the openable/closable member 5. This can also prevent the damages to the optical cables 9 stemming from the abrupt opening/closure.

FIG. 14A is an illustration useful for explaining an air passage according to the second embodiment of the present invention, and FIG. 14B is a front elevational view showing a shelf according to the second embodiment of the present invention.

With the above-described construction, in the shelf 300, the cooling air sucked through the unit A passes through an air passage, changed in the shelf 300, and is discharged through the unit B.

Moreover, as shown in FIG. 14B, the insertion/removal of the unit A is feasible while exhibiting the function for the looping (winding) of the optical cables 9 and, hence, the advantages almost similar to those of the first embodiments are obtainable.

(C) Others

It should be understood that the present invention is not limited to the above-described embodiments, and that it is intended to cover all changes and modifications of the embodiments of the invention herein which do not constitute departures from the spirit and scope of the invention.

Although the above-mentioned transmission relates to transmission of optical and electric signals, the present invention is also applicable to other modes.

For example, the present invention is similarly applicable to audio/visual equipment in which an amplifier(s) and various types of media players are stored in one rack. Concretely, in a case in which cable connectors are located on the front surfaces of units such as amplifiers and media players and the connections among the connectors are made through cables, there is a possibility that the cable wiring intersects with the units such as amplifier and media players. The present invention is also applicable to such a case.

Moreover, although the access panel unit 10 and others have a box-like configuration in which its vertical length is smaller and are mounted horizontally in the shelf body 1a, it is also acceptable that they are stored vertically.

In addition to transmission of optical signals, this structured shelf is also applicable to transmissions of electric signals, power line signals and other signals.

As a different example of a rack configuration, in place of the columns 40 shown in FIG. 1, although not shown, it is also appropriate that, for example, two columns having U-shaped cross-sectional configuration are used so that both side surfaces of the shelf 1 are sandwiched between back portions of the columns.

What is claimed is:

1. A structured shelf comprising:
   a shelf body in which a first opening portion for insertion/removal of a first unit connected to a cable and a second opening portion for insertion/removal of a second unit having a predetermined function are formed in a predetermined surface portion;
   an extra-cable looping device a covering surface adapted to cover the second opening portion, on which an extra portion of said cable is wound around an axis that is orthogonal to the covering surface; and
   a moving mechanism for moving said extra-cable looping device so that it enables said second unit to insert into, or remove from said second opening portion.

2. The structured shelf according to claim 1, wherein said moving mechanism includes an openable/closable member rotatable around its one side portion or one end portion attached onto a surface portion constituting a margin portion of said second opening portion closer to said first opening portion.

3. The structured shelf according to claim 2, wherein said extra-cable looping device is secured to said openable/closable member.

4. The structured shelf according to claim 2, wherein a damper mechanism is provided in said openable/closable member.

5. The structured shelf according to claim 2, wherein said openable/closable member is constructed as an openable/closable member having a configuration raised outwardly with respect to said second opening portion.

6. The structured shelf according to claim 2, wherein a plurality of through-holes are made in said openable/closable member.

7. The structured shelf according to claim 5, wherein said openable/closable member is made using a mesh-like member.

8. The structured shelf according to claim 1, wherein said cable is a cable for signal transmission.

9. A structured shelf comprising:
   a shelf body in which a first opening portion for insertion/removal of an access panel unit connected to a cable and a second opening portion for insertion/removal of a functional unit having a predetermined function including at least a cooling function and a power supply function are formed in a predetermined surface portion;
   an extra-cable looping device having a covering surface adapted to cover the second opening portion, on which an extra portion of said cable is wound around an axis that is orthogonal to the covering surface; and
   a moving mechanism for moving said extra-cable looping device so that it enables said functional unit to insert into, or remove from said second opening portion.

10. A structured shelf comprising:
    a shelf body in which a plurality of first opening portions each for insertion/removal of a first unit connected to a cable are formed in parallel with a desired surface portion and a second opening portion into/from which a second unit having a predetermined function is inserted/removed in a direction of intersecting with said first unit at a position adjacent to said plurality of first opening portions is formed in said surface portion;
    an openable/closable member rotatable around its one side portion or one end portion attached onto a surface portion constituting a margin portion of said second opening portion closer to said first opening portions;
    an extra-cable looping device having a covering surface adapted to cover the second opening portion, secured to said openable/closable member for looping an extra portion of said cable thereon around an axis that is orthogonal to the covering surface in at least one position of the openable/closable member; and a moving mechanism for moving said extra-cable looping device so that it enables said second unit to insert into, or remove from said second opening portion.

11. The structured shelf according to claim 10, wherein said cable is secured to said surface portion and said openable/closable member so that a transient disposition portion from a disposition portion of said cable on said surface portion to a disposition portion thereof on said openable/closable member has a bending radius larger than an allowable bending radius of said cable.

12. The structured shelf according to claim 10, wherein a damper mechanism is fitted to said openable/closable member.

13. The structured shelf according to claim 10, wherein said openable/closable member is constructed as an openable/closable member having a configuration raised outwardly with respect to said second opening portion.

14. The structured shelf according to claim 10, wherein a plurality of through-holes are made in said openable/closable member.

15. The structured shelf according to claim 10, wherein said cable is a cable for signal transmission.

16. A structured shelf comprising:
a shelf body in which a first opening portion for insertion and removal of a first unit connected to a cable and a second opening portion for insertion and removal of a second unit having a predetermined function are formed in a predetermined surface portion; and
a door portion adapted to close and open said second opening portion with respect to a rotation axis arranged in said first opening body side, wherein
an extra portion of said cable is wound on an outside of said door portion around an axis that is orthogonal to a covering surface plane of said door portion.

* * * * *